United States Patent [19]

Sugimori et al.

[11] Patent Number: 5,208,670
[45] Date of Patent: May 4, 1993

[54] TELEVISION SYSTEM FOR TRANSMITTING AUXILARY IMAGE SIGNALS IN THE BLACK BANDS IN ACCORDANCE WITH IMAGE MOTION

[75] Inventors: Yoshio Sugimori; Yoshihide Kimata; Toshiya Ito, all of Tokyo, Japan

[73] Assignee: Nippon Television Network Corporation, Tokyo, Japan

[21] Appl. No.: 629,554

[22] Filed: Dec. 18, 1990

[30] Foreign Application Priority Data

Dec. 27, 1989 [JP] Japan .................................. 1-339380

[51] Int. Cl.⁵ ........................ H04N 7/00; H04N 11/00
[52] U.S. Cl. .................................. 358/141; 358/140
[58] Field of Search .............. 358/141, 12, 140, 11, 358/105

[56] References Cited

U.S. PATENT DOCUMENTS

| | | | |
|---|---|---|---|
| 4,961,112 | 10/1990 | Sugimori et al. | 358/141 |
| 4,984,077 | 1/1991 | Uchida | 358/140 |
| 4,984,078 | 1/1991 | Skinner et al. | 358/141 |
| 5,031,030 | 7/1991 | Hurst, Jr. | 358/12 |

FOREIGN PATENT DOCUMENTS 63-070678 3/1988 Japan .
1-241293 9/1989 Japan .
63078107 10/1989 Japan .

*Primary Examiner*—James J. Groody
*Assistant Examiner*—Safet Metjahic
*Attorney, Agent, or Firm*—Schwartz & Weinrieb

[57] ABSTRACT

A television system, in which a picture is transmitted from an oblong screen to a television screen having an aspect ratio of 3:4, which is different from that of the oblong screen, and wherein no-picture portions are developed within upper and lower sections of the television screen, signals are transmitted into such upper and lower no-picture portions of the television screen in accordance with detected non-moving and moving picture portions of the oblong screen so as to improve the resolution of the picture image displayed upon the television screen.

3 Claims, 7 Drawing Sheets

ARRANGEMENT OF RASTER

AX

BX

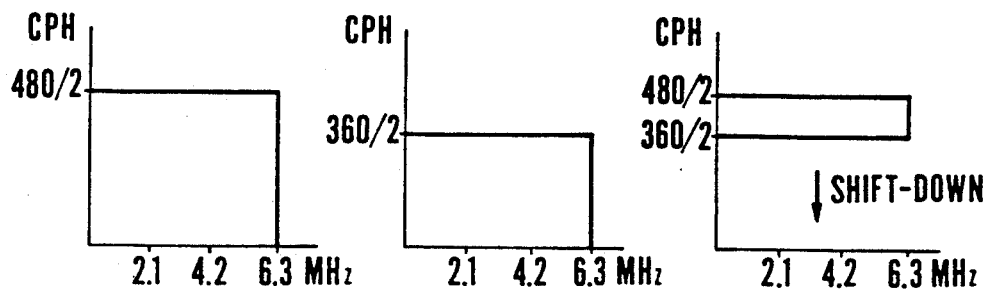
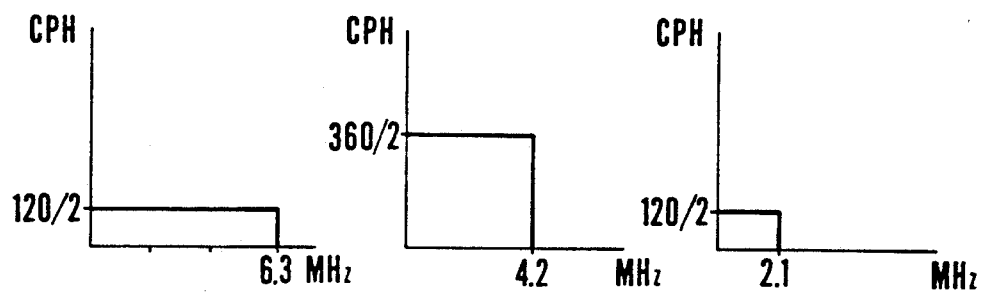
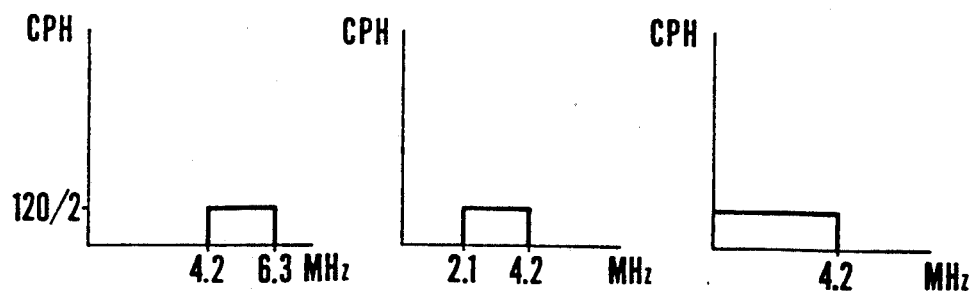

ARRANGEMENT ON THE RECEIVING SIDE

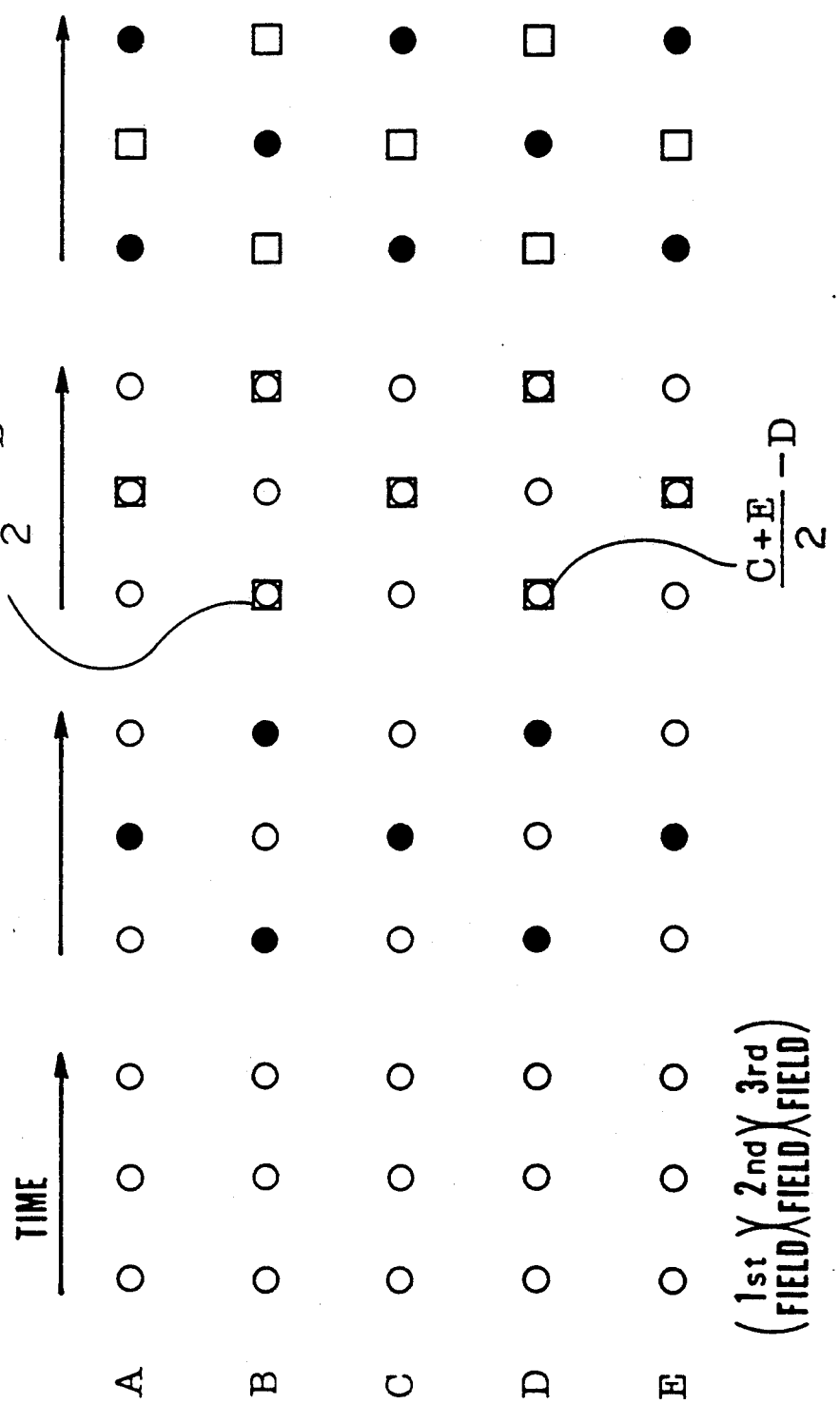

TELEVISION SYSTEM FOR TRANSMITTING AUXILARY IMAGE SIGNALS IN THE BLACK BANDS IN ACCORDANCE WITH IMAGE MOTION

FIELD OF THE INVENTION

The present invention relates to a television transmitting and receiving system in which no-picture portions defined within the upper and lower sections of the screen are effectively utilized and resolution of the picture image is improved particularly when the picture displayed upon the screen is moving, such as, for example, when a cinemascope picture is being received by means of a normal or conventional television receiving set.

BACKGROUND OF THE INVENTION

Single channel high resolution television systems, called or known as receiver interchange systems, have been proposed by means of the Massachusetts Institute of Technology (MIT) of the U.S.A. This is a system in which the vertical dimension of the displayed picture image or signal is reduced in accordance with the NTSC system and the signals for improving the resolution of the displayed picture image or signal are incorporated within empty sites defined within the upper and lower sections of the screen. (See the journal "Spectrum"; No 11, pp. 20-25, November 1988; Maruzen & Co.)

Attempts have also been made to improve the resolution of the displayed picture image or signal as viewed in the vertical direction of a television screen normally having an aspect ratio of 3:4. For this purpose, scanning lines for increasing the resolution of the displayed picture image or signal are developed in an amount which corresponds to the predetermined scanning lines comprising the original scanning lines of the picture. The difference between the signals of the scanning lines for the upper and lower sections of the pictures are therefore accommodated or reconciled, and the number of scanning lines which are visible to the human eye is doubled.

The applicant of the present invention has also proposed a television system characterized by means of improved resolution (Japanese Provisional Patent Applications 63-266848 and 2-113688). According to this system, the signals for improving the resolution of the picture images or signals in the vertical and horizontal directions are inserted into the no-picture portions of the signals as described above upon the transmitting side. On the receiving side, a circuit for detecting the movement of interlace signals is provided, and the resolution in the vertical direction is increased by utilizing the information upon the front field.

It appears that the basic concept of the system proposed by means of MIT is to increase the resolution of the picture image or signal in the vertical direction and it does not expect or encompass an increase in the resolution of the picture image or signal in the horizontal direction. As a result, resolution of the picture is not improved very much.

Similarly, the attempt to improve the resolution of the displayed picture image or signal by means of the use of an additional number of scanning lines which corresponds to the original number of scanning lines will not be successful because it is difficult to transmit all of the predetermined number of scanning lines even when special transmission apparatus is provided or special transmission techniques are employed upon the transmitting side so as not to transmit picture signals in the cinemascope mode and consequently, an excessive number of scanning lines are nevertheless transmitted. Furthermore, even when such image transmission and reception is successful, the resolution of the displayed picture image or signal will be improved only in the vertical direction.

According to the technique which the applicant of the present invention has previously proposed, the compensation components in the horizontal and vertical directions are simultaneously transmitted to the no-picture portions defined within the upper and lower sections of the raster for use upon a cinemascope screen. At the receiving side, the signals transmitted onto the no-picture portions of the above raster are restored and added to the signals transmitted onto the oblong screen portion defined at the center of the raster in order to obtain a picture image having a high degree of resolution.

However, because the reproduced picture image or signal displayed upon the oblong screen at the center of raster has the same interlace signals as that of the NTSC, the transmission signal of the television system is the same. Thus, the resolution of the moving picture portion of the picture image or signal in the vertical direction is ½ that of the still picture portion of the picture image or signal. In contrast to such picture signals, it is desired in accordance with the technique previously proposed to restore and add the resolution compensation signals, which are transmitted to the no-picture portions of the raster. Because the resolution of the basic picture signal is extensively decreased during movement thereof, it has become meaningless to introduce or utilize resolution compensation techniques as previously accomplished in connection with the moving portions of the picture image or signal. The desired effect is nevertheless able to be obtained in connection with the still picture portion.

OBJECT OF THE INVENTION

The object of the present invention is to provide a television transmitting and receiving system by means of which the above problems can be overcome and the resolution of the picture image or signal can be reliably improved in both the vertical and horizontal directions even in connection with that of the picture which is moving.

SUMMARY OF THE INVENTION

In connection with a television transmission system in which no-picture portions are provided upon upper and lower sections of a television screen having an aspect ratio of 3:4, the foregoing and other objectives of the present invention are achieved through means of the provision of an oblong screen having an aspect ratio which is different from that of the above and which is provided with no-picture portions within the upper and lower sections thereof, and wherein the picture is subsequently transmitted. Auxiliary signals ar inserted into the no-picture portions, and these signals are used to increase the resolution of the picture image or signal received upon the receiving side, and the invention is further characterized in that:

a signal is obtained by shifting a signal component, which exceeds the horizontal band which is determined by means of the lateral width of the raster, to a lower frequency;

and one of the following signals is transmitted at the same time:

a. a signal obtained by shifting a signal component within the frequency band higher than the vertical frequency determined by means of the number of scanning lines along the vertical direction of the oblong screen and within that portion of the screen wherein the picture is not moving; and b. a signal representing the difference between the number of scanning lines, encompassed within the signal disposed within the above still picture portion, and the number of scanning lines, as effected by means of a picture movement detecting circuit, defined within the portion of the screen wherein the picture is moving.

Upon the receiving side, a circuit for detecting the moving picture is provided, and the received signals are processed.

In order to improve the resolution of the picture image or signal in the horizontal direction, the frequency of the horizontal signal component, which exceeds the horizontal band which is determined by means of the lateral width of the new screen and which is equal to the lateral width of the raster, is shifted, and this altered component is inserted into the no-picture portions and transmitted.

In connection with the portion of the picture image or signal wherein the picture is moving, a scanning line difference signal is obtained for increasing the vertical resolution of the picture image or signal, and this signal is transmitted onto the no-picture portions together with the above signal for improving the horizontal resolution of the picture image or signal. The scanning line difference signal is the signal representing the same number of scanning lines as the scanning lines of the raster for each field of the interlace signal. It is a signal whose function is to improve the space resolution of the signal by inserting it between the scanning lines which constitute the raster. Because the number of scanning lines is relatively small within the no-picture portions of the screen, such is derived after frequency multiplexing or time division multiplexing. Within the still picture portion of the picture image wherein the picture does not move, the component of the band with a frequency higher than the vertical frequency comprising the number of scanning lines disposed upon the oblong screen portion is shifted to a lower frequency and this signal is transmitted onto the no-picture portions of the screen together with the signal for improving the aforenoted horizontal resolution of the picture image or signal. In this case, the movement detecting circuit for each pixel unit is used to determine whether the particular picture portion is the picture moving portion or the still picture portion.

On the receiving side, the signal processing route is changed by means of the movement detecting circuit after the auxiliary signal inserted into the no-picture portions of the screen is separated by means of a time division process or technique. For this reason, the resolution of the picture image or signal can be improved within the picture moving portion in the same way as in the still picture portion.

BRIEF DESCRIPTION OF THE DRAWINGS

Various others objects, features and attendant advantages of the present invention will become more fully appreciated from the following detailed description, when considered in connection with the accompanying drawings in which like reference characters designate like or corresponding parts throughout the several views, and wherein:

FIGS. 3(a)-3(k) illustrate the signal waveforms within each one of the corresponding components or circuit portions of FIG. 1;

FIGS. 7(a)-7(d) are schematic diagrams explaining the scanning line processing in the invention;

DETAILED DESCRIPTION OF THE PREFERRED EMBODIMENT

Figure 1:
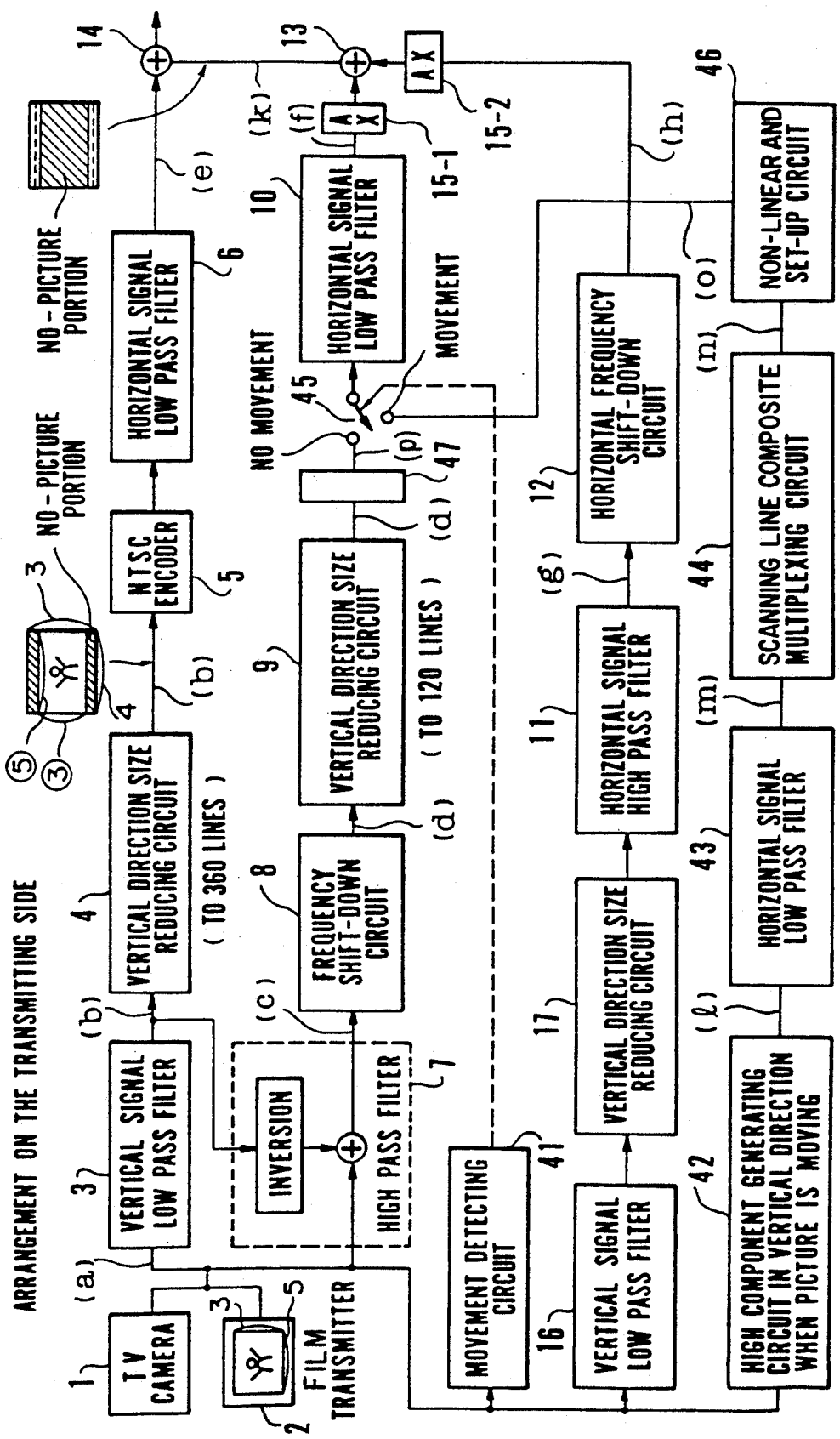
FIG. 1 is a schematic, flow-type diagram illustrating the arrangement of the transmitting side of one embodiment of the new and improved television system developed in accordance with this invention.

FIG. 1 is a schematic, flow-type diagram illustrating the arrangement of the picture transmitting side of the television system constructed in accordance with the embodiment of this invention. In FIG. 1, 1 represents a TV camera, 2 is a picture film transmission device for transmitting pictorial or image signals from a picture film, such as, for example, a motion picture film, 3 represents a vertical signal low pass filter, 4 designates a size reducing circuit for the vertical signal, 5 is an NTSC encoder, 6 represents a low pass filter for the horizontal signal, 7 designates a high pass filter, 9 is a size reducing circuit for the vertical direction, 10 is a low pass filter for the horizontal signal, 11 is a high pass filter for the horizontal signal, 12 represents a horizontal frequency shift-down circuit, 13 and 14 are signal adders, 15-1 and 15-2 are additional circuits which will be described later, 41 is a movement detecting circuit, 42 represents a high pass component generating circuit for affecting the vertical direction of the picture image when the picture is moving, 43 represents a low pass filter for the horizontal signal, 44 designates a multiplexing circuit for the scanning lines, 45 is an electronic switch, 46 designates a non-linear and set-up circuit, and 47 represents a low pass filter for the horizontal signal.

When a cinemascope type motion picture film with an aspect ration of 3:5 is transmitted by means of a television camera 1 or a film transmitter 2, and it is received by means of an NTSC type receiver, no-picture portions are generated within the upper and lower sections of the screen. In recent years, a study has been conducted in connection with high resolution or high quality television, and there is a strong demand for television having a high degree of resolution. The television system according to the present invention can satisfy such demands in connection with improvement of the resolution in both the vertical and horizontal directions regardless of whether the image picture is moving or not as a result of the signal for improving the resolution being issued and processed within the receiving side of the system.

Figure 2:
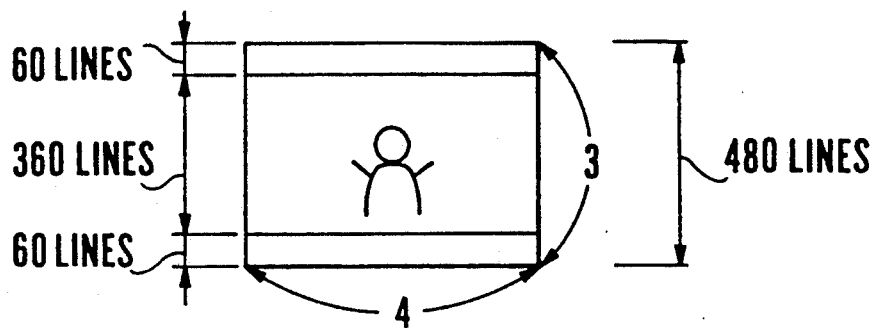
FIG. 2 diagrammatically represents the arrangement of the raster.

FIG. 2 schematically illustrates the arrangement of the scanning raster. In an NTSC system, the picture is transmitted and received by means of a 525 horizontal scanning line format, of which 480 lines are used to display the picture image or signal upon a conventional or normal screen. In view of the fact that progressive or sequential scanning is performed, that the frequency for horizontal scanning so as to obtain 30 pictures per second is 15.75 kHz, and that white/black signals are developed by means of every other scanning line in extreme cases, the space frequency in the vertical direction of the screen is (480/2) CPH. CPH is a unit to express cycle per height, and it corresponds to the resolution of 6 MHz in the horizontal direction.

FIGS. 3(a)-3(k) illustrate the signal waveforms within each one of the component blocks of FIG. 1, and are shown as functions of band value frequency and space frequency. In this figure, (a), (b) ... represent the corresponding positions in two figures. The ordinate axis represents space frequency in the vertical direction, and the abscissa axis designates the band value expressed by means of the frequency (Hz) in the horizontal direction. FIG. 3(a) shows the output picture signal of the television camera 1 or film transmitter 2. In a cinemascope type picture, the picture comprising 480 lines in the vertical direction is transmitted through means of 360 lines, and the picture is displayed over the full extent of the screen in the horizontal direction. Accordingly, a portion of the picture as viewed in the vertical direction is not displayed upon the screen, and the resolution of the picture in the vertical direction is decreased. For this reason, there is a sufficient quantity of signals in the longitudinal and lateral directions at the position shown at (a) in FIG. 1. As shown upon the output side of the vertical size reducing circuit 4, there are no-picture portions displayed upon the upper and lower ends of the screen. The information for improving the resolution of the picture image, that is, the signals, which were not transmitted and actually disappeared in the past, are provided upon these portions, and the frequency is shifted and transmitted.

IMPROVEMENT OF THE VERTICAL RESOLUTION OF THE STILL PICTURE IMAGE PORTION UPON THE SCREEN

In connection with the waveform of characteristic of section (b) of FIG. 1, the space frequency in the vertical direction of the screen is passed through the low pass filter 3 so that it is converted into a signal having (360/2) CPH. As shown in FIG. 3 (b), after passing through the low pass filter 3, the signal is reduced in size to 360 lines of the raster as illustrated in FIG. 2 and is transmitted. The signals of FIG. 3 (c), which cannot pass, are reduced in size to 60 lines above and below the raster and are transmitted. For this purpose, the signals of FIG. 3 (b) are inverted by means of high pass filter 7 and are added to the signal of FIG. 3 (a). Thus, the signals of FIG. 3 (c) are obtained. Next, the signal of FIG. 3 (c) is shifted by means of the frequency shift-down circuit 8, and the signal of FIG. 3 (d) is obtained. In case only the vertical resolution is to be improved, the signal of FIG. 3 (d) is added to the signal of FIG. 3 (e) by means of the adder 14 and can be broadcast. The high pass filter 7 illustrated in FIG. 1 may be one having a normal single arrangement.

IMPROVEMENT OF THE VERTICAL RESOLUTION OF THE MOVING PICTURE IMAGE PORTION UPON THE SCREEN

In FIG. 1, the components including the movement detecting circuit 41 to the non-linear and set-up additional circuit 46 are operated in connection with that portion of the screen where the picture is moving. The signal characterized by means of section (l) in FIG. 1 is a signal of a high pass component in the vertical direction having the effect of improving the vertical resolution, and the circuit 42 generating this signal is operated as illustrated in FIG. 7. FIG. 7 (a) shows the input signal of the high pass component generating circuit 42, FIG. 7 (b) illustrates the input signal of the NTSC encoder 5, FIG. 7 (c) illustrates the scanning line signal into or within the generating circuit 42, and FIG. 7 (d) illustrates the scanning line output signal from the generating circuit 42. The output signal (l) from the generating circuit 42 is converted into an interlace scanning signal. As can be appreciated from FIGS. 7 (a)-7 (d), this signal is obtained by computing the difference between the scanning lines and has high frequency components in the vertical direction. The signal (l) is limited in its horizontal band to approximately 0.5-1 MHz by means of the horizontal signal low pass filter 43 and it is converted into the signal (m). In the present invention, the signal for improving the resolution of the picture image is transmitted onto the no signal portions defined within the upper and lower sections of the screen. Here, the number of scanning lines within the no-signal portions is 120 (60 lines for one field), and this is not enough to transmit the signal (m) immediately.

Figure 8:
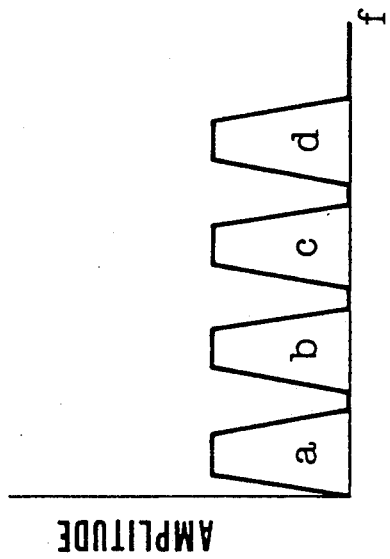
FIG. 8 illustrates the multiplexing of the scanning line information of a plurality of scanning lines.
Figure 12:
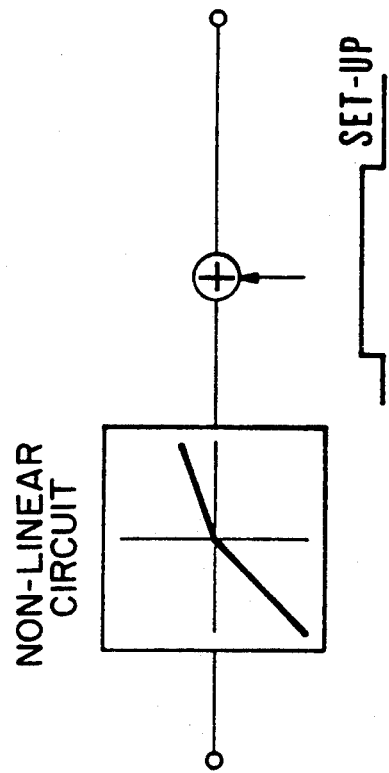
FIG. 12 to FIG. 15 are schematic diagrams illustrating and explaining the set-up and removal of the various circuits in accordance with one embodiment of this invention.

Accordingly, within the scanning line composite multiplexing circuit 44, the signals comprising a plurality of scanning lines are frequency-multiplexed as shown in FIG. 8 and are converted into signals comprising one scanning line. For example, if 480 scanning lines are bundled into groups of four lines each, the number of scanning lines is 120 lines after conversion. Because the number of scanning lines is one-half of that of the frame in accordance with the interlace scanning, the output signal (n) of the circuit 44 is 60 lines per field. The signal (n) facilitates the discrimination upon the receiving side, and it is converted into the signal (o) after being processed in the amplitude direction within the non-linear and set-up addition circuit 46. As shown in FIG. 12, the operation of purpose of the circuit 46 is to add a predetermined set-up to the output of the circuit 44.

Figure 13:
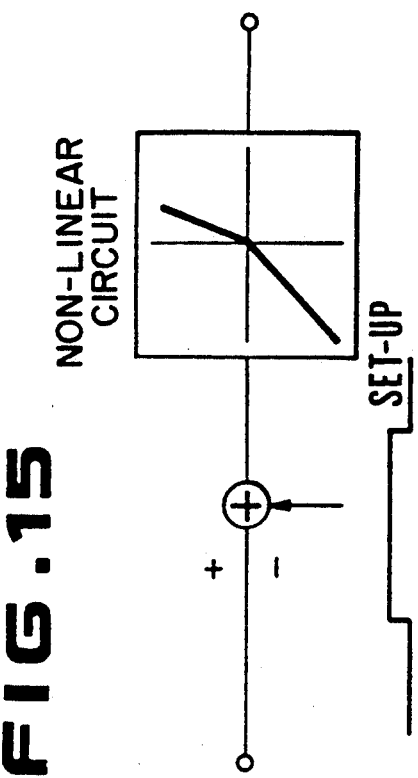

In order to achieve a high frequency component signal for compensation of the still picture portion in the vertical direction, signal processing in the amplitude direction is added by means of the non-linear and set-up additional circuit 46 to the output (d) of the vertical direction size reducing circuit 9, and such signal is converted into the signal (p). As shown in FIG. 13, the operation of the circuit 46 is the same as in the case of FIG. 12. The signal (p) and the signal (o) are converted by means of the output of the movement detecting circuit 41 which is connected to the electronic switch 45, and they enter the horizontal signal low pass filter 10. The, this signal is added to a horizontal high pass component signal through means of an additional circuit (AX) 15-1 and is added to the signal comprising the main picture disposed at the center of the screen.

IMPROVEMENT OF HORIZONTAL RESOLUTION

In order to achieve improvement of the horizontal resolution of the picture image, the following is performed according to the invention in connection with the signal shown in FIG. 3 (d), that is, the signal for improving the vertical resolution of the still picture. The frequency of the signal of FIG. 3 (d) in the horizontal direction is distributed up to 6.3 MHz, and it is passed through low pass filter 10 so as to be converted into the signal of FIG. 3 (f). On the other hand, the signal of FIG. 3 (a) is passed through the vertical signal low pass filter 16. Next, it is passed through the vertical direction size reducing circuit 17 and the horizontal signal high pass filter 11, whereby the signal of FIG. 3 (g) is obtained. Then, the signal of FIG. 3 (h) is obtained by passing the signal of FIG. 3 (g) through the frequency shift-down circuit 12. By adding the signals of FIG. 3 (f) and FIG. 3 (h) within the adder 13, the band required for transmission of all of the above signals in the horizontal direction is limited to 4.2 MHz, as provided for the transmission, and the signal are broadcast.

On the other hand, on the portion of the screen wherein the picture is moving, instead of the signal for improving the vertical resolution of the above still picture portion, the signal obtained from the circuits 42–46 are transmitted at the same time as the signal (h) for compensation of the horizontal resolution of the picture image.

Figure 9:
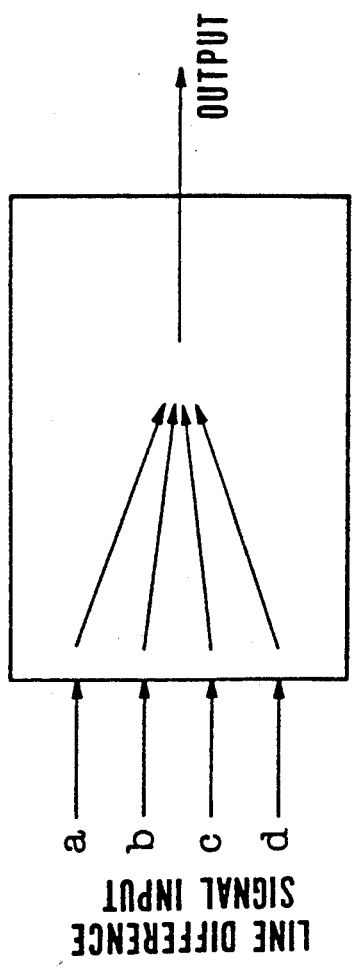
FIG. 9 illustrates the frequency of the multiplexing of the information of a plurality of scanning lines to a single scanning line.

The output from the circuit 46 is as shown in FIG. 9, and the band for the entire signal is 2 MHz. (The band is the same as in FIG. 3 (f).)

PROCESSING OPERATION OF THE RECEIVER

Figure 4:
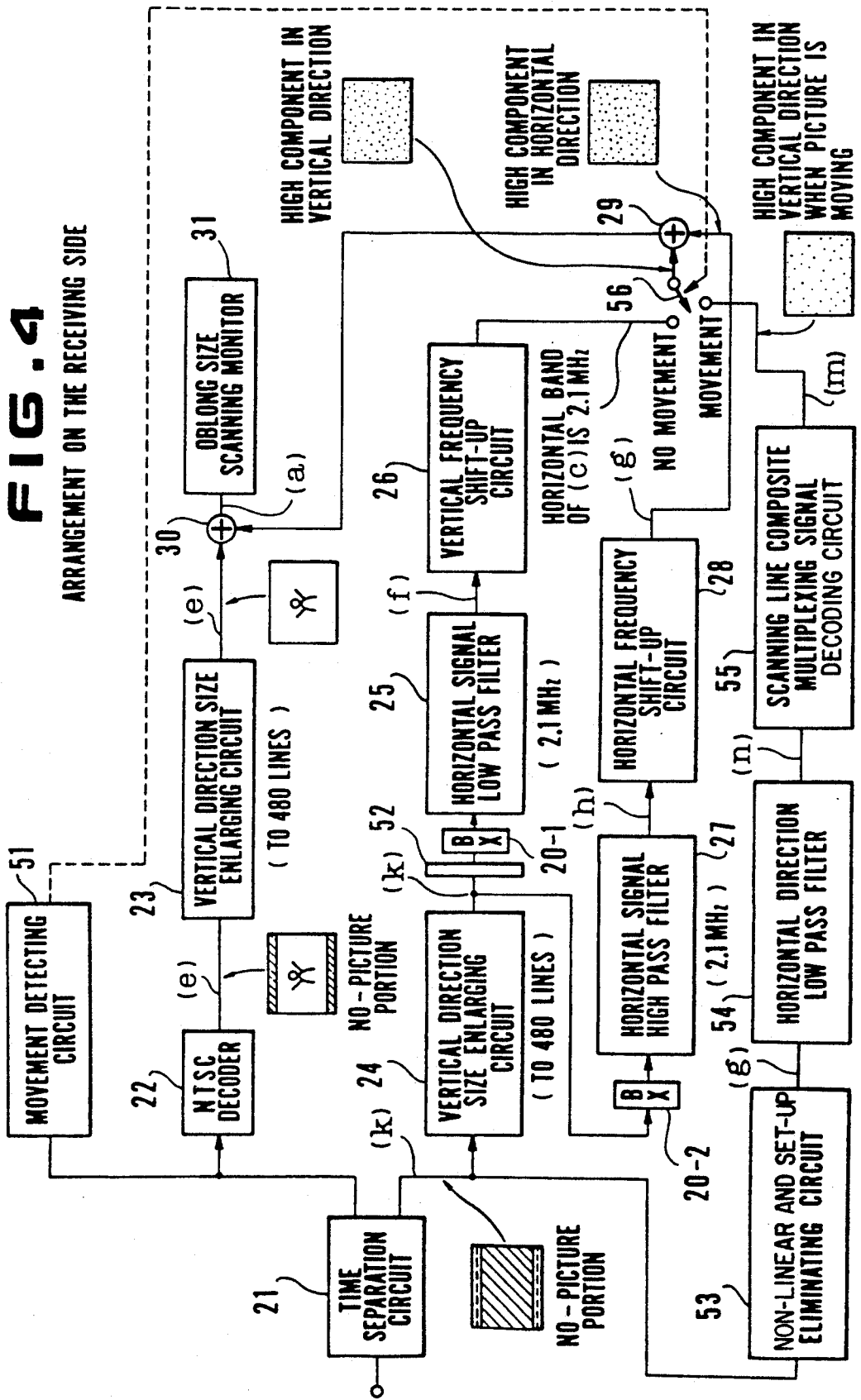
FIG. 4 is a schematic, flow-type diagram illustrating the arrangement of the receiving side of the television system of the present invention and corresponding to the transmitting side of the system of FIG. 1.

FIG. 4 shows the arrangement of a receiver corresponding to the transmitter of FIG. 1. In FIG. 4, 20-1 and 20-2 are additional circuits BX as will be described later, 21 is a reference character representing a time separation circuit for the signals, such as, for example, a circuit for counting the number of scanning lines and for separating the signals, 22 represents an NTSC color decoder, 23 and 24 are reference characters which represent vertical direction size enlarging circuits, 25 designates a horizontal signal low pass filter, 26 indicates a vertical frequency shift-up circuit, 27 represents a horizontal signal high pass filter, 28 is indicative of a horizontal frequency shift-up circuit, 29 and 30 represents signal adders, 31 represents an oblong size scanning monitor, 51 designates a movement detecting circuit, 52 and 53 represent non-linear and set-up eliminating circuits, 54 designates a horizontal direction low pass filter, 55 is indicative of a scanning line composite multiplexing decoding circuit, and 56 represents an electronic switch.

The signal obtained at (f) and transmitted to the vertical frequency shift-up circuit 26 with a horizontal band frequency of 2.1 MHz comprises high frequency information for the vertical direction (information for improving the resolution of the picture image), and it enters one of the electronic switches 56.

Figure 10:
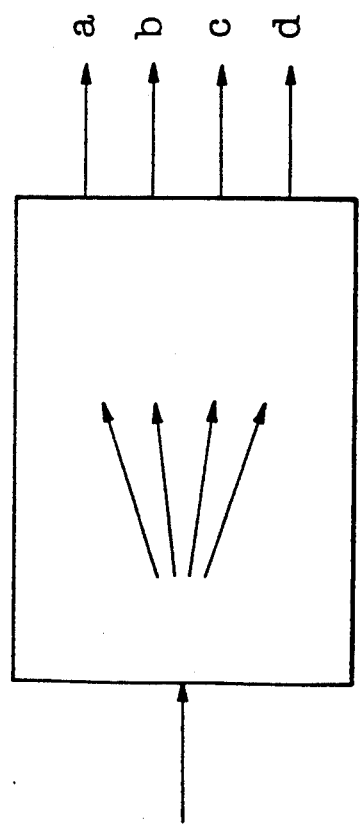
FIG. 10 illustrates the separation of the multiplexed signal from the signal where the information of a plurality of scanning lines was multiplexed.

Utilizing the fact that a part of the output of the time separation circuit 21 has a signal level which is larger than a predetermined value within the circuit 523, signal processing which is the reverse of that of the signal processing within the circuit 46 upon the transmitting side is performed after discrimination of the signals, and the signal then enters the horizontal direction low pass filter 54. The output from filter 54 comprises a signal having the frequency characteristics of FIG. 9, and it enters the scanning line multiplexing decoding circuit 55. Within the circuit 55, the signal multiplexed to or with a plurality of scanning lines are decoded as shown in FIG. 10.

Figure 11:
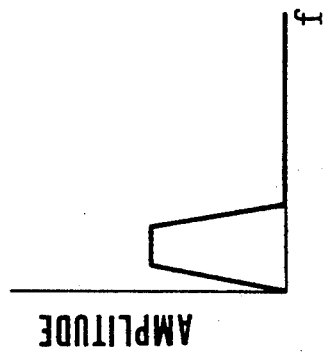
FIG. 11 illustrates the band of the separated signals.
Figure 14:
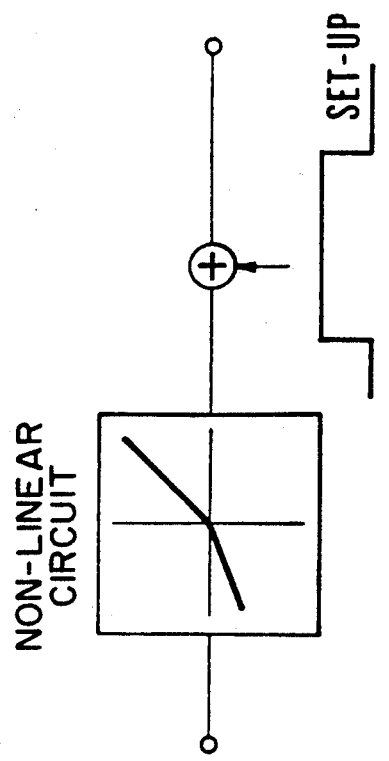
Figure 15:
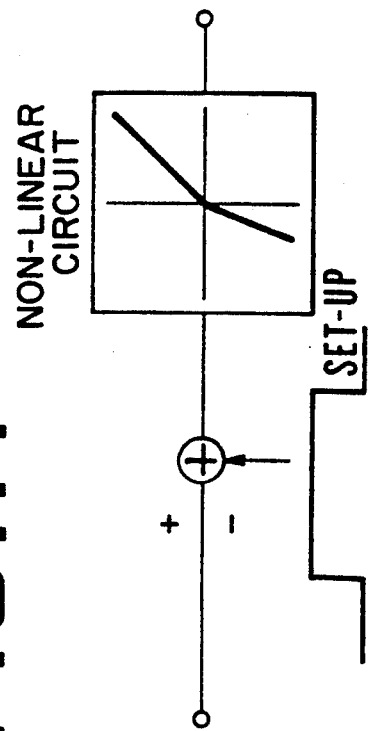

The circuit 52 located between the circuits 24 and 20-1 discriminates the high frequency information signal of the still picture in the vertical direction as in the case of the circuit 53, and signal processing which is the reverse of that of the processing within the circuit 47 upon the transmitting side is performed. FIG. 14 illustrates the operation of the circuit 53, and FIG. 15 likewise illustrates the operation of the circuit 52. The signal band of the decoded scanning lines is as shown in FIG. 11.

In this case, the number of scanning lines of the signal transmitted upon the no-picture portions of the screen is 60 lines per field, and the number of scanning lines of the output of the circuit 55 is four times as many, that is, 240 lines (per field).

The electronic switch 56 is controlled by means of the output of the movement detecting circuit 51. The output signal of the circuit 26 is supplied to the adder 29 when the picture is not moving, and the output of the circuit 55 is supplied to the adder 29 when the picture is moving. After being added to the information for improving the horizontal resolution of the picture image as obtained from the circuit 28, such composite signal is added to the main picture at the center of the screen by means of the adder 30.

In so doing, a picture having a high degree of resolution including high frequency information in the horizontal direction, in the vertical direction with respect to the moving picture, and in the vertical direction with respect to the still picture are obtained upon the oblong configured scanning monitor.

In FIG. 4, which has been noted as illustrating the arrangement of the television system of the present invention upon the receiving side, the signal entering the time separation circuit 21, NTSC decoder 22, the movement detecting circuit 51, the vertical direction size enlarging circuit 24, and the scanning line composite multiplexing signal decoding circuit 55, and these signals are of the interlace scanning type, while the signals of the other components are of the sequential scanning type.

PROCESSING WHEN INSERTION SIGNAL IS CONSPICUOUS

When the above processing is performed, no-picture portion occur or are developed within the upper and lower portions of the screen of a normal receiving unit, and the presence of the signal for improving the resolution of the picture image may become conspicuous. In such a case, it is preferably to additionally utilize the following means.

Figure 5:
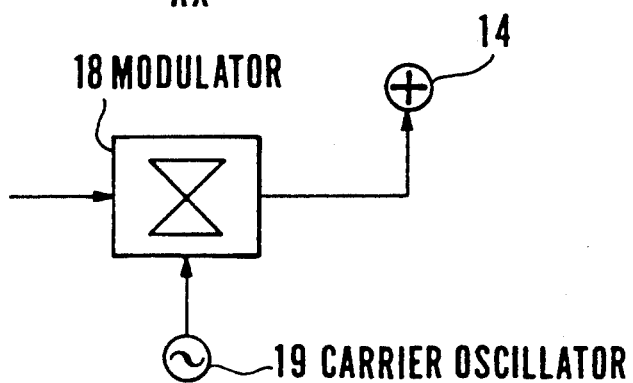
FIG. 5 illustrates the means for reducing the conspicuousness of the auxiliary signal used in this invention.

FIG. 5 illustrates one of the arrangements of the additional circuits of AX 15-1 and 15-2 in FIG. 1. In FIG. 5, 18 represents a modulator, and 19 represents a carrier oscillator. Before two types of auxiliary signals for improving the resolution of the picture image are added to the original picture signal by means of the adder 14 upon the transmitting side, each of the auxiliary signals is modulated by means of the modulator 18 through means of a predetermined carrier signal. In this case, the phases of the oscillation frequency of the two oscillators 19 is deviated by means of 90 degrees with respect to each other so that it can be separated upon the receiving side even when the signals are transmitted at the same time. More particularly, the system of the present invention is arranged in such a manner that the oscillation frequency of the oscillator 19 is an odd multiple of one-half of the horizontal scanning frequency of 15.75 kHz, that is, it has interleaving characteristics. In connection with the no-picture portions of the picture image upon the screen, the insertion signal for improving the resolution of the picture image is in the form of dots and are deviated upwardly or downwardly, and this reduces the conspicuousness of the insertion signal. It is also preferable to use a carrier suppression type amplitude modulator as the modulator 18. In this case, the operation of the horizontal frequency shift-down circuit 12 is performed by shifting the signal of 4.2-6.3 MHz downwardly to 0-2.1 MHz in FIG. 1.

Figure 6:
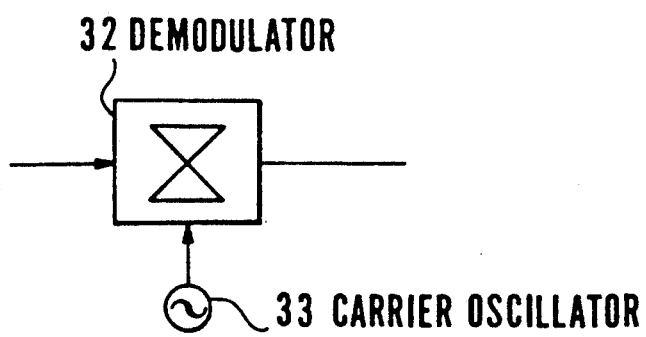

FIG. 6 illustrates the arrangement of additional circuits of BX 20-1 and 20-2 in FIG. 4. In FIG. 6, 32 denotes a demodulator, and 33 represents a carrier oscillator. The oscillator 33 sets the oscillating frequency to the same as that of the oscillating frequency of the oscillator 19 on the transmitting side. The additional circuits 20-1 and 20-2 are inserted upon the output side of the vertical size enlarging circuit. In this case, the operation of the horizontal frequency shift-up circuit 28 of FIG. 4 is to shift the signal of 0-2.1 MHz upwardly to 4.2-6.3 MHz, and the horizontal signal high pass filter 27 must be removed.

As described above, it is possible according to the present invention to obtain the same satisfactory picture in the case where the picture is moving as that of the case wherein the picture is not moving because of the high vertical resolution of the picture image which is achieved by inserting the auxiliary signals for improving the vertical and horizontal resolution of the picture image onto those portions which normally comprise no-picture portions when an oblong picture, such as, for example, a cinemascope type picture is transmitted and received. Therefore, when the picture is received by means of a special purpose monitor for scanning in the oblong direction, a picture with a high degree of resolution can be obtained. When the picture is received by means of a conventional type receiving unit, the transmitted information inserted onto the no-picture portions of the screen does not become conspicuous.

Obviously, many medications and variations of the present invention are possible in light of the above teachings. It is therefore to be understood that within the scope of the appended claims, the present invention may be practiced otherwise than as specifically described herein.

We claim:

1. A television system, in which a picture is transmitted to a television screen having an aspect ratio of 4:3 form an oblong screen having an aspect ratio which is different from that of said television screen so as to result in the development of no-picture portions within upper and lower sections of said television screen having said aspect ratio of 4:3, which is different from that of said oblong screen, and wherein signals are inserted into said no-picture portions of said television screen such that said signals are used as signals for improving the resolution of said picture upon said television screen, comprising:

means for transmitting a first signal obtained by shifting a horizontal signal component, which exceeds the horizontal band determined by means of the lateral width of said television screen which is equal to the width of the scanning raster thereof, down to a lower frequency;

means for developing a second signal which is obtained by shifting a vertical signal component, with a band which has a vertical frequency which is greater than the vertical frequency determined by means of the number of scanning lines in the vertical direction of said oblong screen within the portion of said oblong screen wherein said picture si not moving, to a lower frequency;

means for developing a third signal which comprises the difference between the scanning lines characteristic of said portion of said oblong screen within which said picture is not moving and a portion of said oblong screen within which said picture is moving; and a picture movement detecting circuit for selectively transmitting either one of said second and third signals, along with said first signal, depending upon detection by said circuit of a non-moving picture portion or a moving picture portion.

2. A television system according to claim 1, further comprising:

means for frequency multiplexing said third scanning line difference signal prior to transmission of said third scanning line difference signal.

3. A television system according to claim 1 or 2, further comprising:

means incorporated within a transmission side of said television system for discriminating information corresponding to said portion of said screen wherein said picture is moving from information corresponding to said portion of said screen wherein said picture is not moving;

a picture movement detecting circuit, incorporated within a receiving side of said television system, for detecting a moving picture portion of said television screen; and means for discriminating and processing an output signal of said picture movement detecting circuit of said receiving side of said television system.

* * * * *